United States Patent [19]

Scanland et al.

[11] Patent Number: 4,667,459
[45] Date of Patent: May 26, 1987

[54] TWO ACTION CONTROL FOR POWER MOWERS

[75] Inventors: Joseph E. Scanland; Robert E. Gray, both of Savannah, Ga.

[73] Assignee: Roper Corporation, Kankakee, Ill.

[21] Appl. No.: 711,800

[22] Filed: Mar. 14, 1985

[51] Int. Cl.⁴ ............................................. A01D 75/22
[52] U.S. Cl. ...................................... 56/11.3; 56/10.8; 180/19.3; 74/475; 192/3 S
[58] Field of Search ...................... 56/10.5, 10.8, 11.3, 56/11.8; 192/99 R, 99 S, 131 R, 12 R, 3 S; 74/485 R, 480 R, 475; 180/19.3

[56] References Cited

U.S. PATENT DOCUMENTS

| 4,428,180 | 1/1984 | Carlson | 56/10.8 |
| 4,432,191 | 2/1984 | Schwitt | 56/11.3 |
| 4,466,232 | 8/1984 | Beugelsdry et al. | 56/11.3 |
| 4,503,958 | 3/1985 | Nishio | 56/11.3 |
| 4,573,307 | 3/1986 | Wick | 56/10.8 |
| 4,580,455 | 4/1986 | Beugelsdry et al. | 180/19.3 |

Primary Examiner—Gene Mancene
Assistant Examiner—John G. Weiss
Attorney, Agent, or Firm—Leydig, Voit & Mayer

[57] ABSTRACT

A handle mounted control for the blade brake clutch mechanism and/or the ground wheel drive of a walk-behind rotary power mower. The control requires two distinct actions for actuation. The first action is movement of a deadman lever in the form of a bail from a disengaged to an engaged position. The second action is movement of the control lever from disengaged position to operating position when the deadman lever is in engaged position. Release of the deadman lever to disengaged position releases the control lever from operating position and permits it to return to disengaged position under the biasing force of a cable connected between the control lever and the controlled mechanism on the mower deck.

12 Claims, 14 Drawing Figures

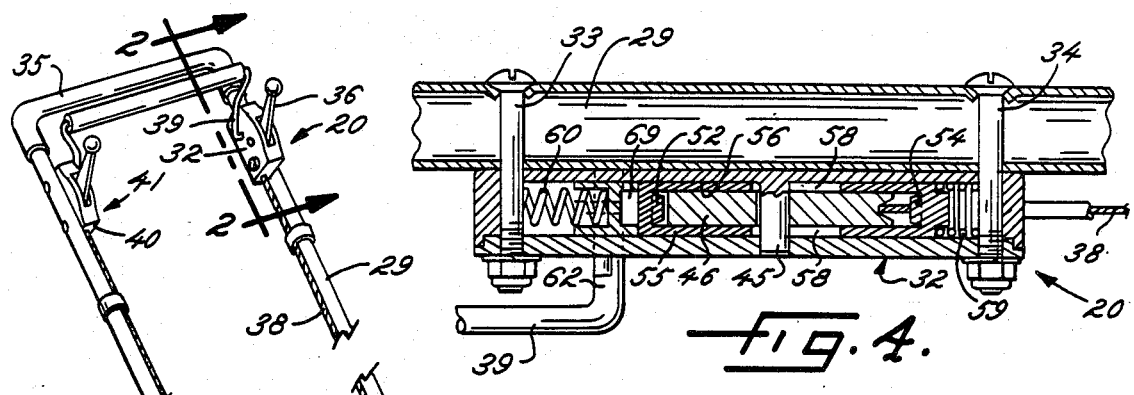
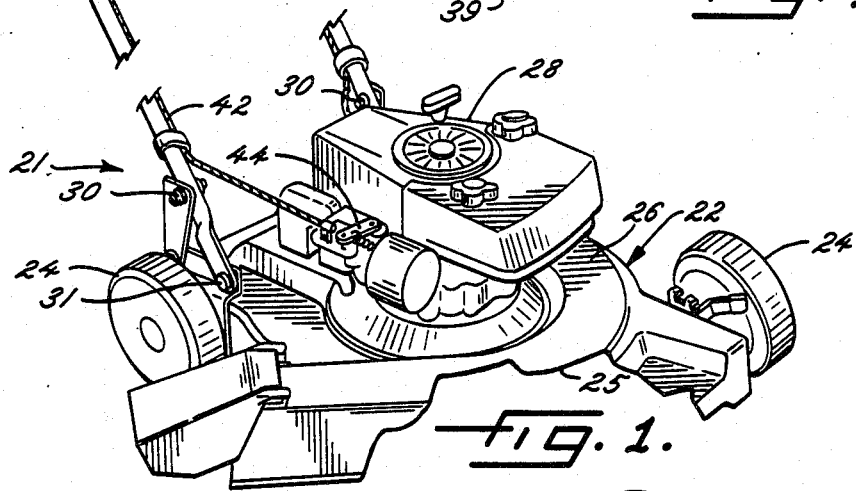
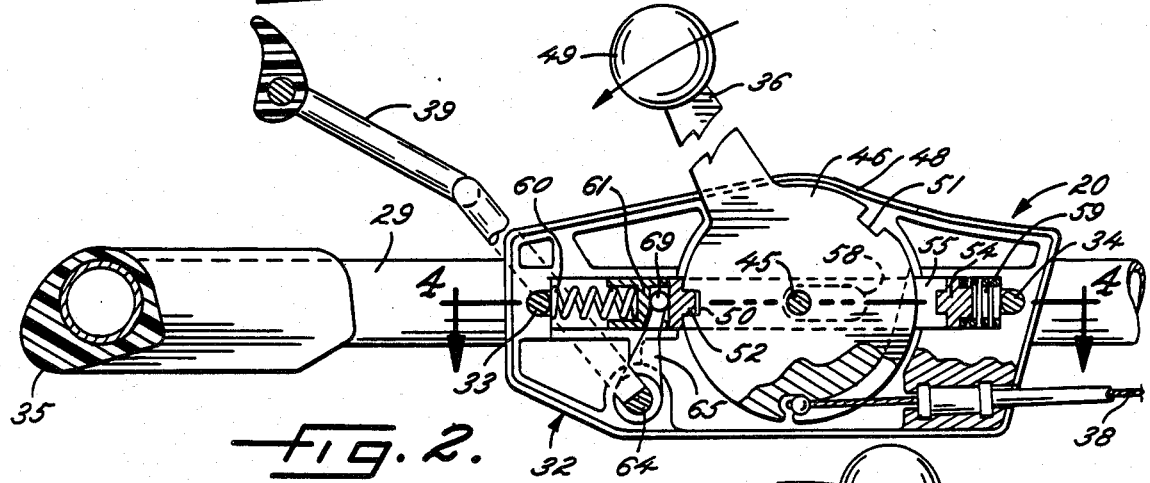
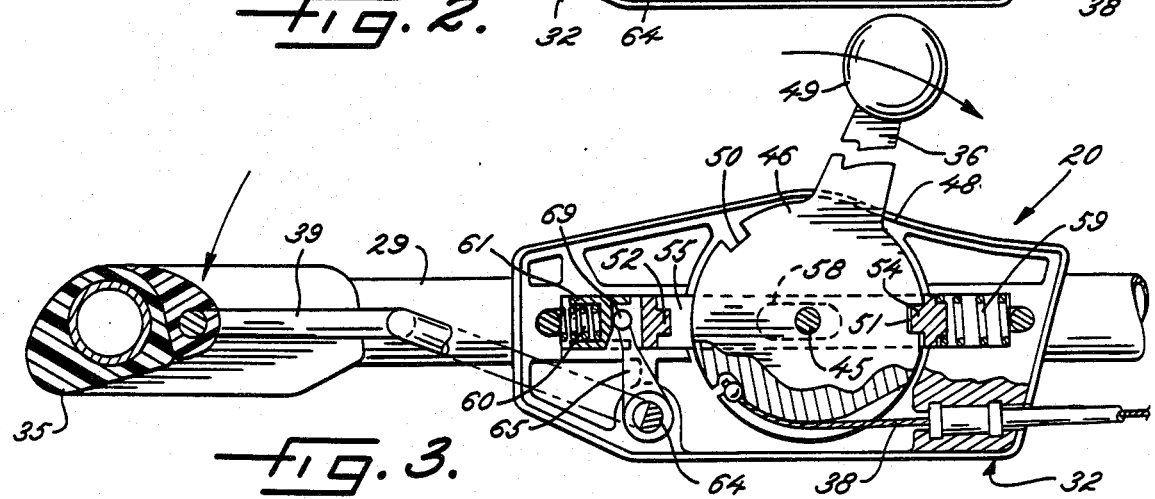

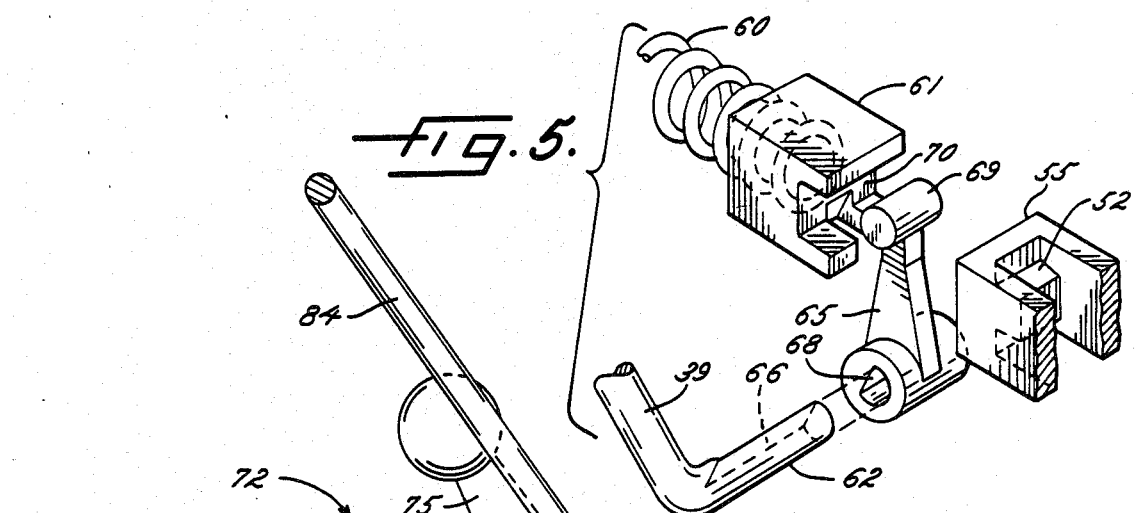
_fig.5._
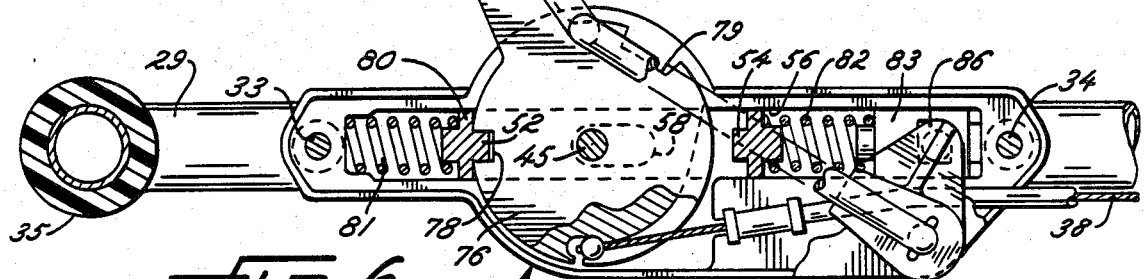
_fig.6._
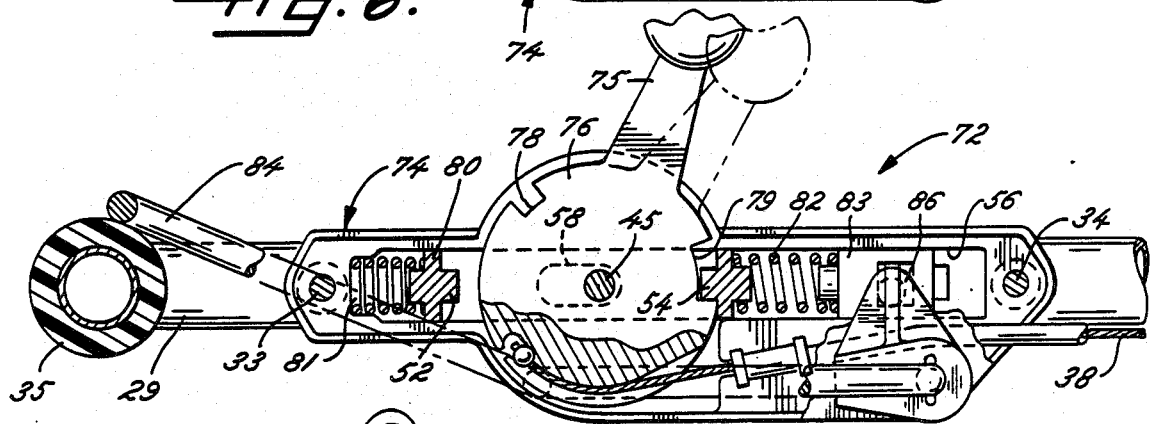
_fig.7._
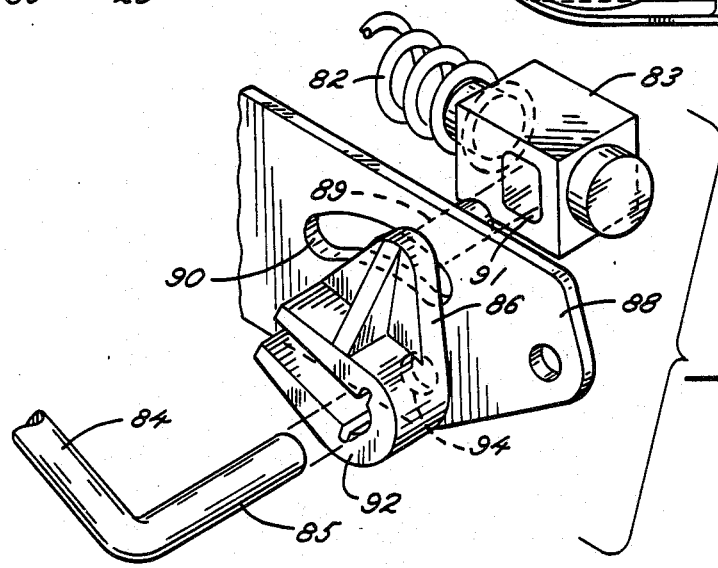
_fig.8._

TWO ACTION CONTROL FOR POWER MOWERS

BACKGROUND OF THE INVENTION

The present invention relates in general to walk-behind power implements such as power lawn mowers and, more specifically, to an improved handle mounted control for such an implement.

Prevailing safety regulations for power lawn mower controls require two actions to actuate the control. Many of the power lawn mower controls known heretofore utilize deadman levers which are spring loaded or otherwise mounted in the disengaged position until tripped manually to engaged position. Controls of this type are disclosed in the followig U.S. Pat. Nos:
4,167,221—Edmonson et al
4,362,228—Plamper et al.
Power mower controls that require two distinct motions for engagement are shown in the following U.S. Pat. Nos:
4,327,539—Bricko
4,362,228—Plamper et al.
4,363,206—Schmitt
4,428,180—Carlson
Many of the prior controls for power mowers are unduly complex and/or insufficiently positive in operation. In view of the serious consequences which could result from even a partial failure of such a control, a substantial need exists for a control which is positive acting, reliable, and simple to operate.

SUMMARY OF THE INVENTION

One object of the present invention is to provide an improved control for power lawn mowers having a control lever and a deadman lever wherein the control lever is locked in the disengaged position when the deadman lever is in the disengaged position and which can be locked in the operating position when the deadman lever is in the engaged position.

Another object of the invention is to provide an improved power lawn mower control of the foregoing type wherein the control lever may be positively locked in the disengaged position and also positively locked in the engaged position.

A further object of the invention is to provide a control of the type referred to above in which the control lever may be tripped out of operating position and returned to disengaged position as an incident to return of the deadman lever to disengaged position.

Still another object of the invention is to provide a control of the foregoing type which will permit the control lever when shifted into operating position to be moved slightly beyond operating position to execute another control function and then return automatically to operating position.

A further object is to provide an improved power mower control of the character set forth above which will be both reliable in operation and economical to manufacture.

The foregoing objects of the present invention are accomplished in a handle mounted deadman control which comprises a housing; a control lever supported within the housing and movable between a disengaged position and an operating position each defined by engagement of a selected one of a pair of detents with the control lever; a deadman lever in the form of a bail movable between a disengaged position and an engaged position; the deadman lever when in disengaged position locking the control lever in disengaged position by means of one detent and, when moved to engaged position, releasing the one detent and permitting the control lever to be moved to operating position and locked therein by means of the other detent. Release of the deadman lever to its disengaged position releases the other detent holding the control lever in operating position and the control lever returns to its disengaged position under the biasing force of a cable connected between the control lever and the controlled mechanism on the mower deck.

The control requires two distinct actions for actuation. The first action is movement of the deadman lever from a disengaged to an engaged position. The second action is movement of the control lever from disengaged position to operating position position when the deadman lever is in engaged position.

BRIEF DESCRIPTION OF THE DRAWINGS

FIG. 1 is a fragmentary perspective view of an illustrative power lawn mower equipped with a control exemplifying the present invention.

FIG. 2 is a longitudinal sectional view through the embodiment of the control shown in FIG. 1, taken in the plane of the line 2—2 with the control in disengaged position.

FIG. 3 is a longitudinal sectional view similar to FIG. 2, but with the control in the engaged position.

FIG. 4 is a horizontal sectional view through the control as shown in FIG. 2, taken in the plane of the line 4—4.

FIG. 5 is an enlarged, fragmentary perspective view detailing the connection between the deadman lever and the control shown in FIGS. 1-4.

FIG. 6 is a longitudinal sectional view similar to FIG. 2, but illustrating another embodiment of the present invention with the control in disengaged position.

FIG. 7 is an enlarged longitudinal sectional view corresponding to FIG. 6, but with the control in the engaged position.

FIG. 8 is an enlarged fragmentary perspective view detailing the connection between the deadman lever and the control of FIGS. 6 and 7.

Figure 9:
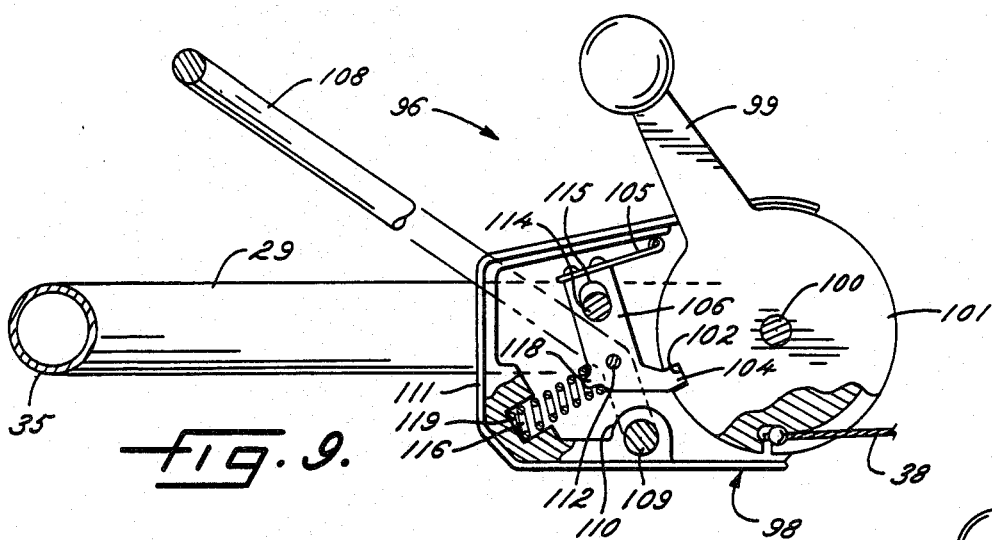
FIG. 9 is a longitudinal sectional view similar to FIG. 2, but illustrating another embodiment of the present invention with the control lever in disengaged position.

While the invention is susceptible of various modifications and alternative constructions, certain preferred embodiments have been shown in the drawings and will be described below in considerable detail. It should be understood, however, that there is no intention to limit the invention to the specific forms described but, on the contrary, the intention is to cover all modifications, alternative constructions and equivalents falling within the scope of the appended claims.

DETAILED DESCRIPTION

Referring more specifically to FIGS. 1-5 of the drawings, one embodiment of the present invention is there exemplified in a control 20 for a power lawn mower 21 of the rotary type. The mower 21 comprises a body 22 supported on ground wheels 24 serving as a blade housing 25. The top side of the body comprises a mower deck 26 which supports the engine 28 used to drive the rotary blade and the rear drive wheels 25. The mower in this instance has a tubular handle 29 of inverted U-shape fixed to the body 22 as by bolts 30, 31. The handle 29 serves as a mounting for the power controls of the mower and also as a steering and guiding means.

The control 20 (FIGS. 1-5) comprises an oblong housing 32 attached as by bolts 33, 34 to the left leg of handle 29 a short distance below the padded cross bar 35. The control includes a control lever 36 connected as by means of a bowden cable 38 to the mechanism on the mower deck which is to be controlled. Such mechanism may be a brake-clutch device for the rotary blade or a clutch device for the ground wheel drive. The control further includes a deadman lever 39 in the form of a generally U-shaped bail pivotally mounted at one end in the control housing 32 and at its opposite end in housing 40 of engine throttle control 41. The latter is connected as by a bowden cable 42 to throttle lever 44 of the mower engine.

In accordance with the present invention, provision is made in the control 20 for locking the control lever in the disengaged position when the deadman lever 39 is in the disengaged position, and for locking the control lever in the operating position when the deadman lever 39 is in the engaged position hand-held against the cross bar 35 of the handle (FIGS. 2, 3). The control lever 36 is accordingly mounted for pivotal movement on a fixed shaft 45 extending transversely of the housing 32. The control lever has an inner portion in the form of a circular disc 46 situated within the housing and a radially extending arm projecting through slot 48 in the top of the housing terminating in a knob 49.

The circular disc 46 of the control lever has an arcuate peripheral surface with two circumferentially spaced positioning notches 50, 51 formed therein. These notches are adapted to cooperate with corresponding positioning detents 52, 54 projecting toward each other and situated at opposite ends of a movable locking member in the form of a generally rectangular slide 55 (FIGS. 2-4). The notch 50 and detent 52 are adapted to register with each other to define the disengaged position of the control lever 36. The notch 51 and detent 54 are adapted to register with each other to define the operating position of the control lever.

The slide 55 straddles the circular disc 46 of the control lever and is mounted in a guideway 56 for limited reciprocation within the housing along a diameter of the disc portion 46. Such movement of the slide is facilitated by oblong clearance slots 58 formed in its sidewalls in the region of the fixed shaft 45. The slide is biased in opposite directions by opposed springs, one such spring 59 bearing against the right hand end of the slide and an abutment at the right hand end of the guideway (as viewed in FIGS. 2-4). The other spring 60 is interposed between an abutment at the left hand end of the guideway and a rectangular plunger 61 bearing against the left hand end of the slide 55. The spring 60 is stronger than the spring 59, introducing a bias tending to move the slide 55 and the detents 52, 54 to the right as viewed in FIGS. 2-4.

The deadman lever 39 is adapted to effect selective application of the bias of springs 59 and 60 and thereby shift the slide 55 longitudinally of the guideway 56. This, in turn permits selective engagement of the detents 52, 54 with their respective positioning notches 50, 51 on the control lever. The deadman lever 39 is accordingly formed with a horizontal pivot shaft 62 journaled in aligned bearing apertures 64 in the housing sidewalls. The shaft 62 has force transmitting means in the form of a short pivot finger 65 drivingly fixed thereto as by means of interfitting flats 66, 68 on the shaft 62 and on the pivot finger 65, respectively (FIGS. 2-5). The finger 65 has a cylindrical boss 69 at its upper end which fits within a transverse recess 70 in the plunger 61. The finger 65 is oriented in this instance at an angle of approximately 50° to the adjacent portion of the deadman lever 39.

When the deadman lever 39 is in the disengaged position as shown in FIG. 2, the bias spring 60 and its plunger 61 press the pivot lever boss 69 against the left hand end of the slide. This, in turn, overcomes the bias of the weaker spring 59, moving the slide to the right. Such motion presses the detent 52 into positioning notch 50 in the arcuate surface of the control lever disc 46 when the control lever is in its disengaged position, freeing the detent 54 from contact with the disc 46.

When the deadman lever 39 is in the engaged position, in which the U-shaped bail is hand-held against the handle cross bar 35 as shown in FIG. 3, the pivot finger 65 presses the plunger 61 to the left, compressing the spring 60 against the left hand end of the guideway and permitting the weaker spring 59 to move the slide 55 to the left. This motion presses the detent 54 into contact with the arcuate surface of disc 46 in anticipation of engagement with the positioning notch 51, freeing the detent 52 from contact with the control lever disc 46. When the control lever 36 is moved to its operating position, the detent 54 snaps into engagement with the positioning notch 51.

In light of the foregoing description, the operation of the control 20 will become more apparent upon reference to FIGS. 2 and 3. Assuming that the control lever 36 and the deadman lever 39 are each in the disengaged position as shown in FIG. 2, the spring 60 has forced the slide 55 to the right so as to overcome the bias of weaker spring 59 and the detent 52 has engaged the positioning notch 50 of the control lever disc 46. The bowden cable 38 is biased in extended position leaving the clutch mechanism on the mower deck disengaged.

Upon shifting the deadman lever 39 rearwardly to engaged position as shown in FIG. 3, the slide 55 moves to the left under the bias of spring 59, disengaging the detent 52 from the positioning notch 50 and forcing the detent 54 against the arcuate surface of the control lever disc 46. The control lever 36 may then be shifted forwardly to the right as viewed in FIG. 3 until the detent 54 registers with and engages the positioning notch 51. This action draws the bowden cable 38 rearwardly against its bias, engaging the clutch mechanism on the mower deck and locking the control lever 36 in engaged position. The mower may then be operated in the normal manner and its speed regulated by the throttle control 41.

Upon release of the deadman lever 39, the spring 60 expands and moves the plunger 61 and boss 69 and slide 55 to the right. Movement of the boss 69 to the right returns the deadman lever 39 forwardly to its disengaged position. Movement of the slide 55 to the right brings the detent 52 against the arcuate surface of the control lever disc 46 and disengages the detent 54 from the positioning notch 51. This unlocks the control lever 36 from its forward engaged position and permits the control lever 36 to be shifted in a rearward direction until the detent 52 engages the positioning notch 50 to lock the control lever in disengaged position. Moreover, even if no manual force is applied to the control lever following return of the deadman lever to disengaged position, the forwardly directed biasing force on the bowden cable 38 will rotate the control lever rearwardly until the detent 52 engages the notch 50 to lock the control lever in disengaged position and shut off the engine. The biasing force on the bowden cable 38 can result from the spring-loaded, normally off, construction of the mower deck mounted mechanism, for example, the ground wheel drive or blade brake-clutch, which is subject to the control of this invention.

Turning next to FIGS. 6–8, a modified form of mower control 72 is there shown which also embodies the present invention. The control 72 includes a number of parts which are substantially identical to those of the control 20 described above and like reference numerals will be used for those parts in the description which follows.

The control 72 comprises a housing 74 functionally similar to the housing 32 and secured as by bolts 33, 34 to the left leg of the handle 29. A control lever 75 is pivotally mounted within the housing 74 on fixed shaft 45. The lever 75 has a circular disc 76 with an arcuate peripheral surface and two circumferentially spaced positioning notches 78, 79, the latter extending through a somewhat greater arc than the detent 54 with which it is associated, whereby notch 79 is wider than detent 54. The disc 76 is straddled by a slide 80 having positioning detents 52, 54 formed at opposite ends of the slide and projecting toward each other. The slide 80 is movable longitudinally of a guideway 56 in the housing and adapted to bring its detents 52, 54 into engagement with coacting ones of the notches 78, 79. Such movement is permitted by clearance slots 58 in the sidewalls of the slide surrounding the fixed shaft 45.

The slide 80 has a biasing spring 81 interposed between its left hand end and the end wall of the guideway 56 (as viewed in FIGS. 6 and 7). Another biasing spring 82 is interposed between the right hand end of the slide and a plunger 83. Plunger 83 is interposed between the spring 82 and the right hand end of the guideway 56 (as viewed in FIGS. 6 and 7). The spring 81 is stronger than the spring 82 to create a bias urging the detent 52 into engagement with the positioning notch 78 of the control lever disc 76.

The control 72 includes a deadman lever 84 similar to the deadman lever 39 in that it has the form of a bail with one leg journaled in the housing of the control 72 and the other journaled in the housing of the throttle control 41. The lever 84 differs from the lever 39, however, in that its horizontal pivot shaft 85 is fixed to a pivot finger 86 situated outside the control housing 74 (FIG. 8). The pivot shaft 85 has a portion which projects beyond the hub of the pivot finger 86 and extends through housing sidewall 88 into a bearing formed in the housing. The pivot finger 86 has a pin 89 fixed to its upper end and projecting through an arcuate slot 90 in the housing sidewall and into a rectangular recess 91 in the spring plunger 83.

The pivot finger 86 in this instance is oriented at approximately 90° to the adjacent portion of the deadman lever 84. The finger 86, which may be molded from high strength plastic material, has a hub 92 with a relatively tight bore 94 for receiving the horizontal pivot shaft 85. The hub 92 has a large radial slot 95 which snugly embraces that portion of the deadman lever 84 immediately adjacent the horizontal pivot shaft 85 and constitutes a drive connection with the lever 84.

Operation of the control 72 is quite similar to that of the control 20. With the deadman lever 84 in disengaged position as shown in FIG. 6, the stronger bias spring 81 has overcome the weaker bias spring 82 and shifted the slide 80 to the right. The positioning detent 52 thus registers with the positioning notch 78 of control lever disc 76, locking the control lever 75 in disengaged position. The bowden cable 38 is in forward extended position disengaging the mechanism on the mower deck, e.g., clutch or ground wheel drive.

When the deadman lever 84 is shifted rearwardly to its engaged position against the handle cross bar 35, the pivot finger 86 and plunger 83 force the spring 82 to the left, thereby compressing the spring 82 and overcoming the force of spring 81. This forces the slide 80 to the left, all as illustrated in FIG. 7, disengaging the detent 52 from the notch 78 and urging the detent 54 against the arcuate peripheral surface of the control lever disc 76. The control lever 75 may now be shifted forwardly until the detent 54 snaps into registration with the notch 79 as shown in FIG. 7.

Since the notch 79 is substantially wider than the detent 54, the control lever may be shifted a few degrees further forward against the biasing force of the bowden cable 38 to the position indicated in dot-dash outline in FIG. 7. Under these conditions, the upper side of the notch 79 is in abutting engagement with the top surface of the detent 54. Such a return-biased, furtherforward position is desirable to effect a momentary actuation, for example, an engine crank mode which may be desirable in an engine throttle control. Thus, in an engine throttle control, the control lever would place the throttle in the "run" position when the control lever is in the forward, locked, operating position. Manual movement of the control lever to the furtherforward position would engage the engine starter motor through the bowden cable, and the control lever would be released when the engine started, thereby allowing the control lever to return to the forward, locked, operating position. This would disengage the starter and the throttle control would continue in the "run" position. The control lever 75 remains locked in operating position until the deadman lever 84 is returned to disengaged position by the biasing force of the stronger spring 81.

Figure 10:
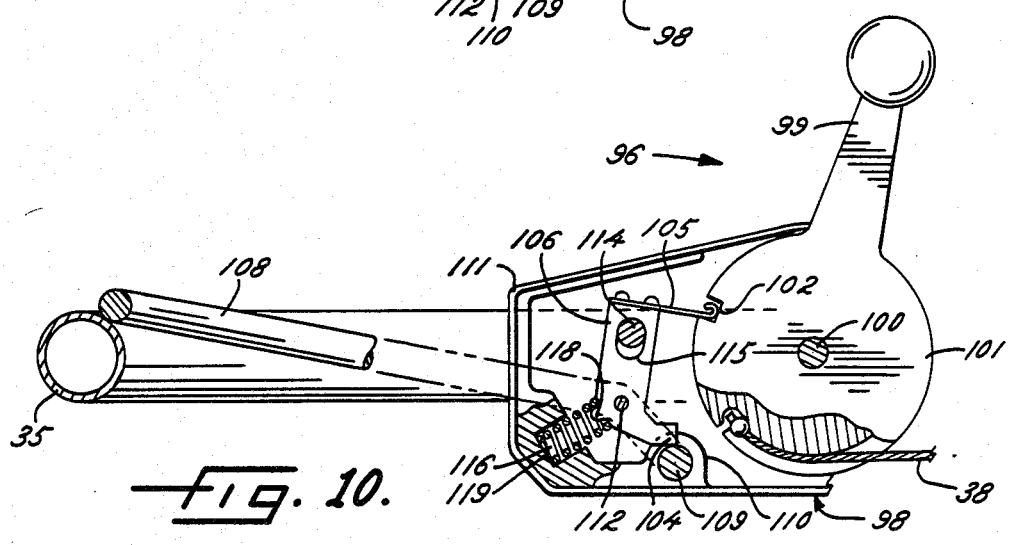
FIG. 10 is a longitudinal sectional view similar to FIG. 9, but with the control lever in engaged position.

Referring next to FIGS. 9 and 10, another modified form of mower control 96 which also embodies the invention is there illustrated. The control comprises a housing 98, shown in fragmentary longitudinal section, having a control lever 99 pivotally mounted on a fixed shaft and connected to the bowden cable 38 which operates a mechanism on the mower deck. The control lever 99 is broadly similar to the control levers 36 and 75, being formed with a circular disc 101 connected to the bowden cable 38 which operates the clutch mechanism on the mower deck. The control lever 99 differs from the control levers 36 and 75 in that it has only a single positioning notch 102 in the arcuate periphery of the disc 101. The notch 102 is adapted to coact selectively with a pair of detents 104, 105 integral with a pivoted link 106. Detent 105 may be a flexible, resilient, cantilever member or a member which is spring loaded outwardly and movable along its longitudinal axis, so as to permit resilient, biased engagement with the arcuate surface of disc 101 when the deadman lever 108 is in its engaged position and before control lever 99 is moved to its operating position.

The control 96 includes a deadman lever 108 in the form of a bail with out-turned pivot shafts 109, one journaled in bearing 110 of housing 98 and the other in a corresponding bearing in the throttle control housing 40. The lever 108 is situated within the control housing 98 and projects outwardly therefrom through a clearance aperture 111 in the rear wall of the housing. The lever 108 is formed with an obtuse angle bend a short distance from the bearing 110 and the link 106 is pivotally attached, as by pin 112, to the deadman lever 108 a short distance from bearing 110. In addition, the link 106 is held captive within the housing by means of a fixed pin 114 which engages an oblong clearance slot 115 in the upper portion of the link 106. The deadman lever 108 and detent 104 are biased toward the disengaged position for the deadman lever 108 and toward the notch 102 engaging position for the detent 104, shown in FIG. 9, by means of spring 116 interposed between a projecting lug 118 on link 106 and a socket 119 formed in the housing wall.

In summarizing the operation of the control 96, it will be assumed at the start that the control lever 99 and the deadman lever 108 are in their disengaged positions, and that the rigid detent 104 registers with the positioning notch 102 in the control lever disc 101, thereby locking the control lever in the disengaged position. When the deadman lever 108 is swung downwardly against the cross bar 35 of the handle 29, the pivoted link 106 is swung clockwise and pulled slightly downwardly as viewed in FIG. 10, causing the detent 104 to withdraw from the notch 102 and bringing the flexible detent into engagement with the arcuate peripheral surface of the control lever disc 101. When tne control lever 99, now unlocked, is shifted forwardly, the flexible detent follows the arcuate periphery of the disc 101 and snaps into registration with the positioning notch 102. Being a resilient member, the flexible detent permits the control lever 99 to be moved through a small additional forward arc so as to start the engine of the mower if this feature is desired. Upon release of the control lever 99 after starting, the tension on the bowden cable swings the control lever a short distance back into operating position where it remains locked until the deadman lever is released, and the deadman lever is then returned to its disengaged position by the action of spring 116. When that occurs, the tension on the bowden cable swings the control lever 99 rearwardly until it reaches its disengaged position where the rigid detent 104 again registers with and engages the positioning notch 102 and locks the lever 99 in disengaged position. Detent 104 engages notch 102 due to the force exerted by spring 116 when the deadman lever 108 is released.

Figure 11:
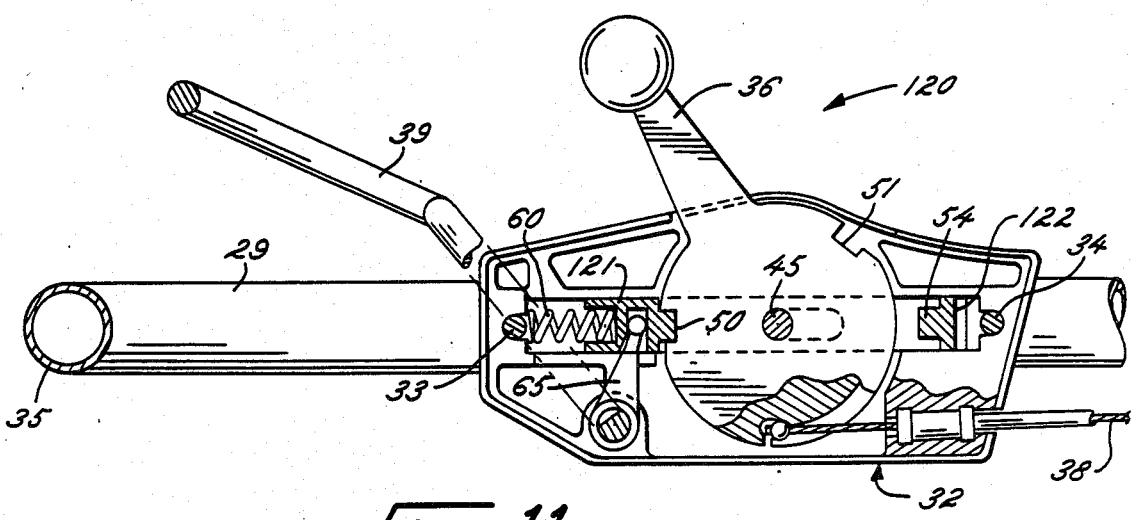
FIG. 11 is a longitudinal sectional view of an embodiment of the invention similar to that shown in FIGS. 1-4, but having the detents integral with the slider and only a single spring on the detent defining the disengaged position.

FIG. 11 shows still another modification of the present invention in the form of a control 120 closely similar to the control 20 described above. The parts of the control 120 are all substantially identical to those of the control 20 except for the fact that only the spring 60 is used and the spring 59 of control 20 has been omitted. In addition, the left hand end portion 121 of the slide 122 has been extended in lieu of the plunger 61 to engage the pivot lever 65 of the deadman lever 39 directly. Engagement of the detent 52 in the positioning notch 50 of the control lever to define the disengaged position of the latter is accomplished when the deadman lever 39 is in the disengaged position shown in FIG. 11. Engagement of the detent 54 with the positioning notch 51 to lock the control lever 36 in operating position is accomplished by holding the deadman lever 39 in its engaged position against the cross bar 35 of the handle.

Figure 12:
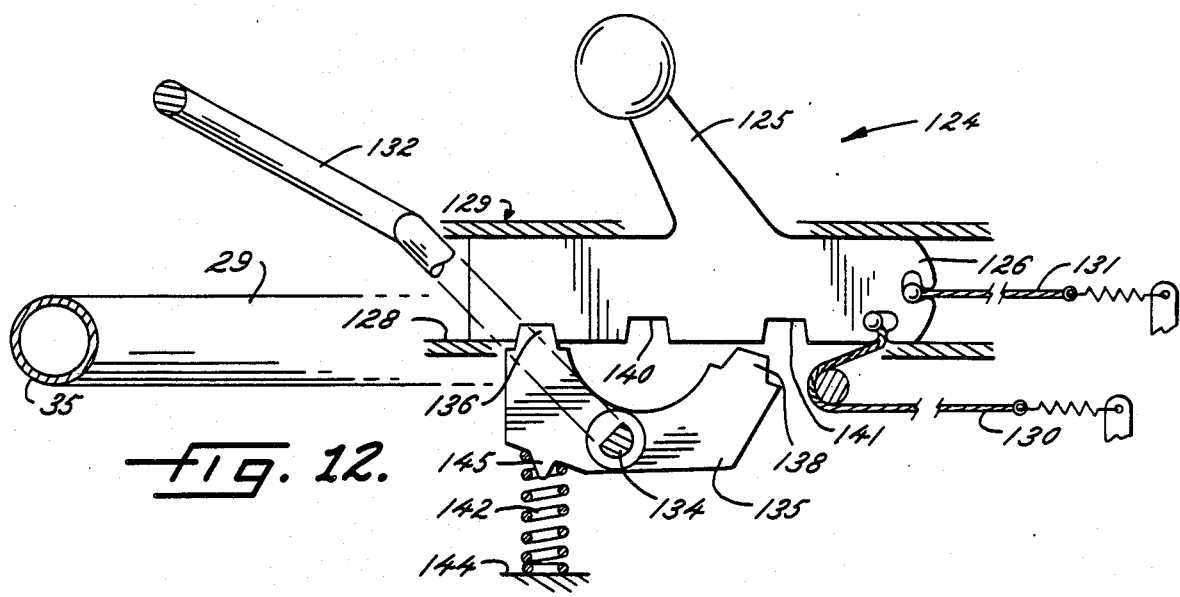
FIGS. 12-14 are longitudinal sectional views showing still another embodiment of the present invention with the control lever in the disengaged position (FIG. 12), the engaged position when moved forwardly (FIG. 13), and the engaged position when moved rearwardly (FIG. 14).
Figure 13:
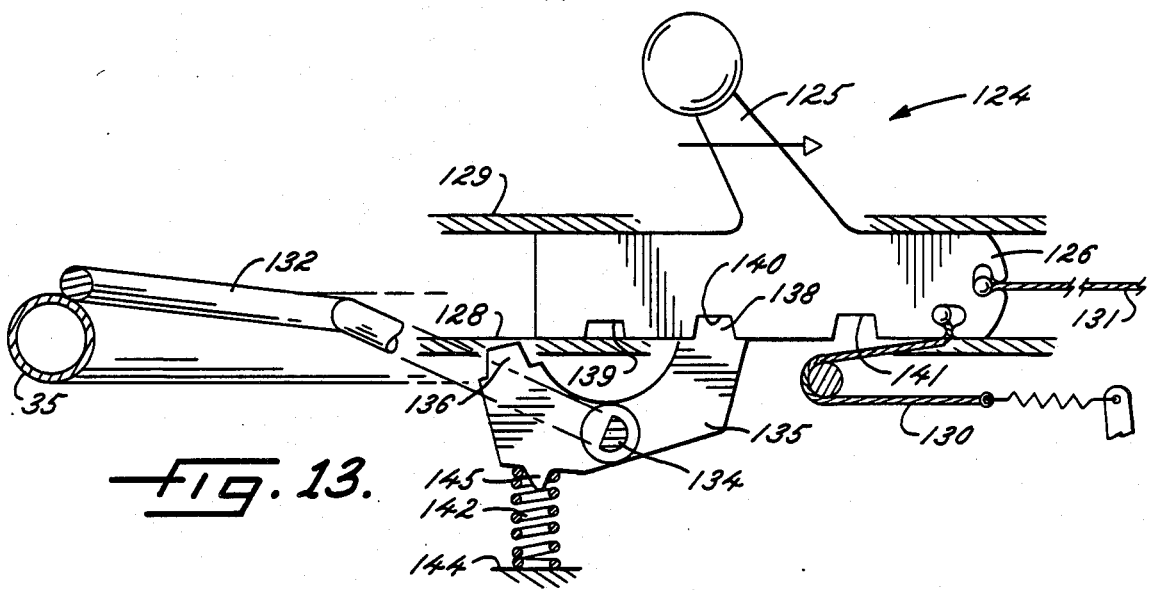
Figure 14:
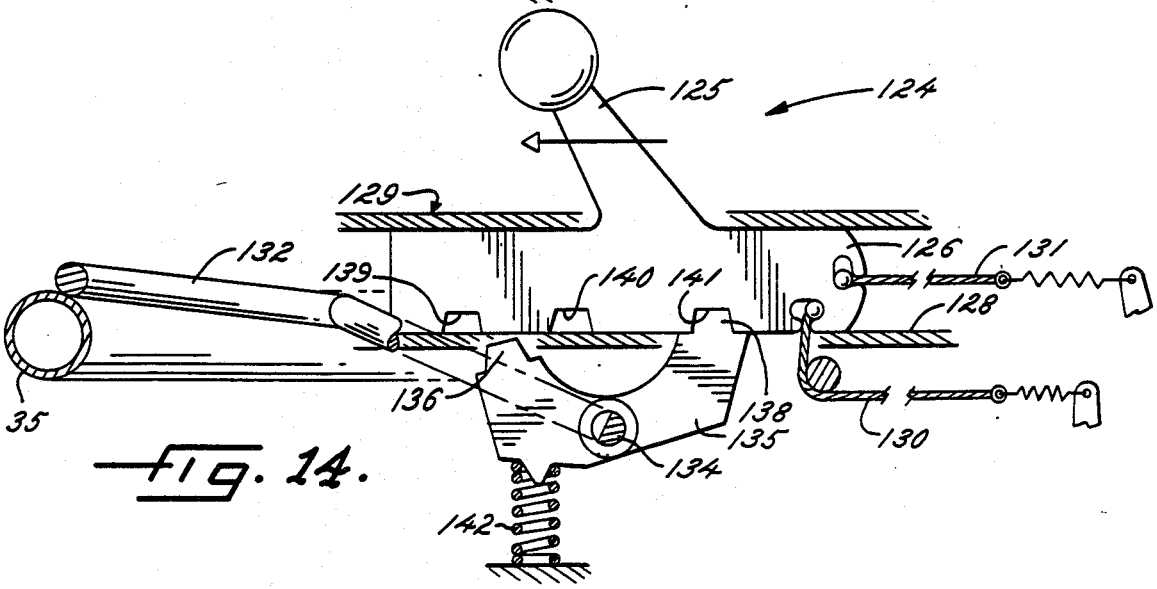

Turning next to FIGS. 12–14, a further modified form of mower control 124 embodying the invention is shown utilizing a sliding control lever 125 rather than a pivoting control lever. The control lever 125 comprises a base 126 slidably mounted in a guideway 128 in the control housing 129 (not shown in detail). The control lever may be moved from its disengaged position, shown in FIG. 12, to an operating position by motion in either a forward or rearward direction. If forward motion is used, as indicated in FIG. 13, the control lever 125 will be biased by the reversely strung bowden cable 130 urging the control lever rearwardly toward its disengaged position. The biasing force of the cable 130 is derived from the clutch mechanism to which it is connected on the mower deck. If, on the other hand, the control lever is to be moved rearwardly to operating position, as indicated in FIG. 14, the other bowden cable 131 will be utilized to exert a biasing force tending to return the control lever forwardly to its disengaged position.

The control 124 includes a deadman lever 132 having an out-turned pivot shaft 134 journaled in the housing 129. A rocker arm 135 formed with detents 136, 138 is drivingly mounted on the pivot shaft of the lever 132. The detents 136, 138 are adapted to selectively engage various ones of the positioning notches 138, 140, 141 formed in the underside of the control lever base 126. When the deadman lever 132 is in the disengaged position as shown in FIG. 12, a bias spring 142 interposed between a support 144 in the housing and a projecting lug 145 on the rocker arm holds the detent 136 in register with the positioning notch 139. This engagement defines the disengaged position of the control lever 125.

When it is desired to shift the control lever 125 forwardly to operating position, the deadman lever 132 is swung downwardly into engagement with the cross bar 35 of the handle, compressing the bias spring 142 and engaging the detent 138 in the positioning notch 140. This defines the operating position of the control lever in those instances that a forward operating position is desired, which requires use of bowden cable 130. The control lever 125 then remains locked in that position as long as the deadman lever is held against the handle. Upon release of the deadman lever 132, the bias spring 142 rotates the deadman lever and the rocker arm 135 in a clockwise direction, disengaging the detent 138 from the positioning notch 140. The biasing force on the reversely strung bowden cable 130 thereupon returns the control lever to disengaged position where it becomes locked by engagement of the detent 136 with the positioning notch 139.

Assuming that the control lever 125 is to be shifted from its disengaged position shown in FIG. 12 rearwardly to an operating position shown in FIG. 14, which requires use of bowden cable 131, the deadman lever 132 is shifted from disengaged position to engaged position, thereby rotating the rocker arm counterclockwise to disengage detent 136 from notch 139, which unlocks control lever 125 so that it can be moved rearwardly to its operating position. This brings the detent 138 into engagement with positioning notch 141 to lock the control lever in operating position. Upon release of the deadman lever 132 and its return to disengaged position, the rocker arm 135 is rotated in a clockwise direction by the action of spring 142, disengaging the detent 138 from the positioning notch 141. This permits the straight run bowden cable 131 to exert a forward bias on the control lever 125, returning it to disengaged position where it is arrested by engagement of the detent 136 with the positioning notch 139.

We claim as our invention:

1. An actuating control for a walk-behind power mower comprising, in combination:
   (a) a housing adapted for mounting on the mower handle;
   (b) a control lever pivotally mounted in said housing and movable between a disengaged position and an operating position;
   (c) means connected to said control lever for applying a biasing force urging said control lever toward its disengaged position;
   (d) means defining a detent bearing surface on said control lever having detent cooperating means;
   (e) a slide mounted adjacent said control lever within said housing and movable longitudinally thereof;
   (f) a pair of opposed detents situated in spaced apart relation on said slide;
   (g) means for biasing said slide for selective engagement of each said detent with said detent cooperating means;
   (h) a deadman lever pivotally mounted on said housing for movement between an engaged position and a disengaged position;
   (i) said deadman lever when in disengaged position being adapted to hold said slide and one said detent in engagement with said detent cooperating means thereby retaining said control lever in disengaged position; and
   (j) said deadman lever when in engaged position being adapted to hold said slide and the other said detent in engagement with said detent cooperating means thereby retaining said control lever in operating position.

2. An actuating control as defined in claim 1, wherein said detent bearing surface on said control lever is curvilinear and said slide straddles said control lever.

3. An actuating control as defined in claim 2, wherein said control lever has a disc defining said detent bearing surface and said detent cooperating means comprises a pair of circumferentially spaced positioning notches in said detent bearing surface.

4. The combination set forth in claim 1, wherein means for biasing said slide comprises a pair of bias springs, one engaging each end of said slide.

5. The combination set forth in claim 4, wherein said deadman lever includes a pivot finger, one said bias spring is stronger than the other, and one of said springs is adapted for engagement by said pivot finger when said deadman lever is moved from disengaged to engaged position.

6. The combination set forth in claim 1, wherein said means for biasing said slide comprises a single bias spring engaging one end thereof, said deadman lever includes a pivot finger, and said single spring is adapted for engagement by said pivot finger when said deadman lever is moved from disengaged to engaged position.

7. The actuating control defined in claim 5, wherein said pivot finger engages said stronger spring.

8. The actuating control defined in claim 5, wherein said pivot finger engages said weaker spring.

9. The actuating control defined in claim 5, wherein said pivot finger is located inside said housing.

10. The actuating control defined in claim 5, wherein said pivot finger is located outside said housing.

11. The combination set forth in claim 5, wherein a plunger is interposed between said pivot finger and said spring engaged thereby.

12. The combination set forth in claim 3, wherein one of said positioning notches is substantially wider than the detent with which said one positioning notch cooperates, whereby said control lever can be moved manually beyond its operating position for performing another control function, said control lever biasing means returning said control lever to operating position following execution of said function.

* * * * *